Aug. 27, 1935.   L. C. TERRILL   2,012,698
ELECTROMAGNETIC BRAKE
Filed Dec. 14, 1932
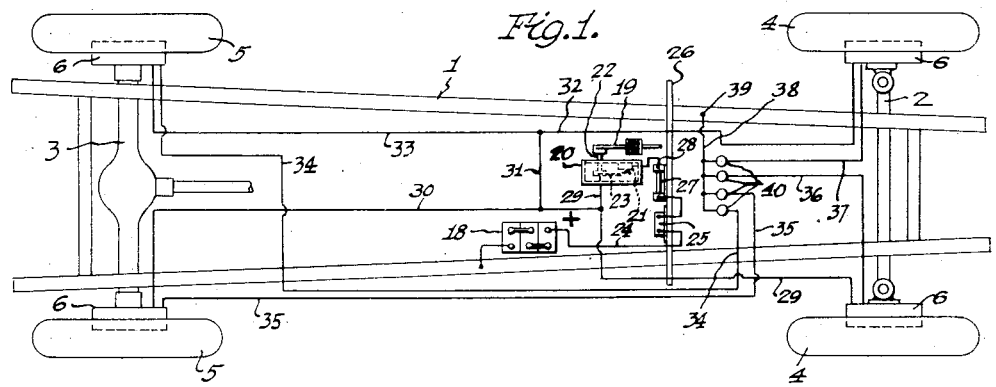
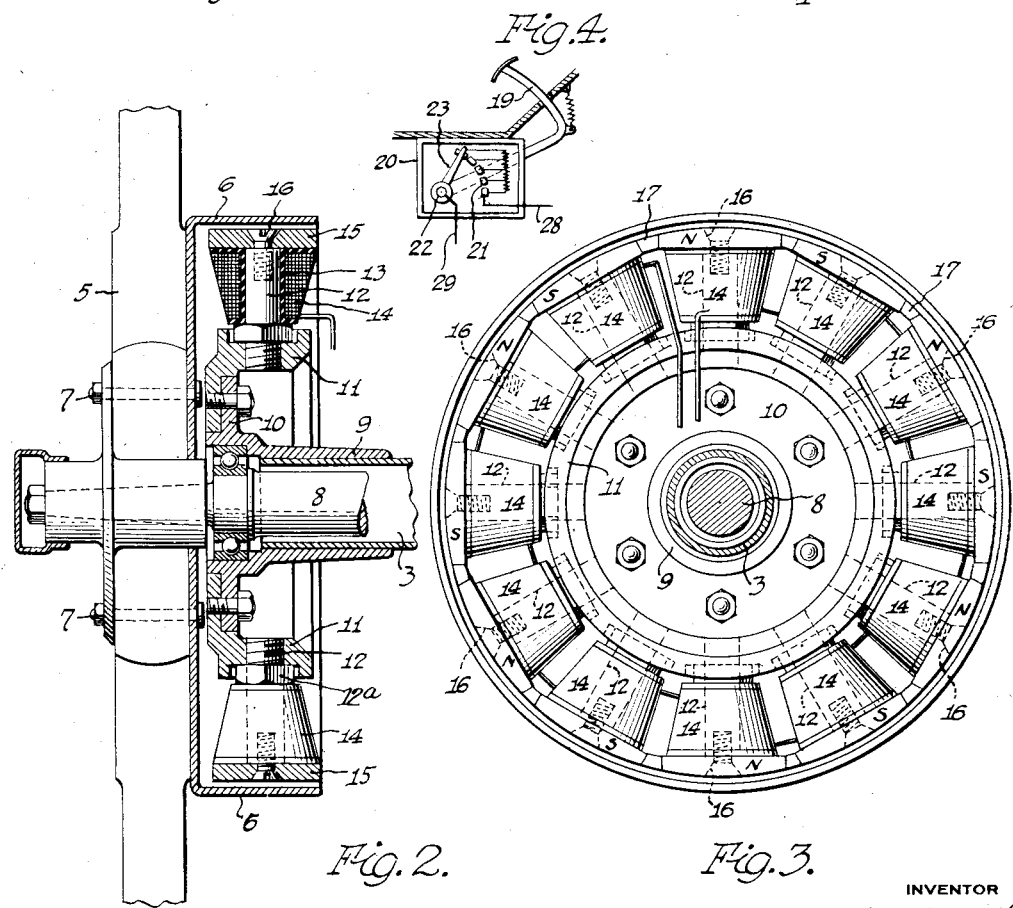
INVENTOR
Leonard Cleo Terrill,
BY
ATTORNEYS Patented Aug. 27, 1935

2,012,698

UNITED STATES PATENT OFFICE 2,012,698

ELECTROMAGNETIC BRAKE

Leonard Cleo Terrill, Detroit, Mich.

Application December 14, 1932, Serial No. 647,171

5 Claims. (Cl. 188—104)

The present invention pertains to a novel electromagnetic braking system designed for use particularly on motor vehicles.

The principal object of the invention is to provide a system of this character energized by the usual battery and operated from the brake pedal. Further, this system is so constructed that the braking effect is proportional to the pressure applied to the pedal.

In the accomplishment of this object, each of the wheels of the vehicle carries a brake drum made of magnetic material. Within each drum is mounted a circular series of electromagnets having a fixed support such as a ring secured to the fixed axle. The several windings carry pole pieces disposed adjacent to the cylindrical wall of the drum, and when the magnets are energized, there is set up a magnetic field which exercises an attractive and retarding effect on the brake drums and hence on the wheels. This attractive effect is due to the fact that magnetic lines of force from a plurality of magnetic fields traverse the drum so that as the drum rotates through the multiplicity of fields the magnetic lines of force induce eddy currents in the drum which resist relative movement of the drum through the field.

The regulated control of the braking action from the brake pedal is accomplished through the medium of a rheostat connected to one side of the electric circuit. The movable arm of the rheostat is actuated by the brake pedal and is connected to the other side of the circuit. Thus, the amount of pressure on the brake pedal determines the setting of the rheostat and hence the amount of current flowing therethrough to the electromagnets and the magnitude of the magnetic field.

The invention is fully disclosed by way of example in the following description and in the accompanying drawing, in which—

Figure 1 is a plan view of a chassis of a motor vehicle, showing also a wiring diagram of an installation according to the invention;

Fig. 2 is a vertical section of a wheel and brake according to the invention;

Fig. 3 is a side elevation of one of the brakes; and

Fig. 4 is a detail elevation of the control rheostat.

Reference to these views will now be made by use of like characters which are employed to designate corresponding parts throughout.

In Figure 1 is illustrated the usual chassis of a motor vehicle mounted on a front axle 2, and a rear axle 3 carrying respectively front and rear wheels 4 and 5 in the usual manner.

Each of the wheels carries at its inner side a brake drum 6 of open cylindrical formation and consisting of magnetic material. The drum is secured to the wheel in any suitable manner as by means of bolts 7.

The rear axle 3 of the vehicle is shown in Figure 2 and in it is journalled the shaft 8 on which the wheel is mounted. Over the end of the axle is secured a sleeve 9 having a flange 10 standing in a vertical plane. To this flange is secured an annular member or armature ring 11 of angular cross section and consisting preferably of magnetic material.

The ring 11 carries a series of metallic studs 12 suitably secured thereto as by a threaded connection and a locknut 12a and extending radially outward. On each stud is fitted a spool 13 of insulating material, and the spool carries a winding 14 of wire adapted to set up a magnetic field when electric current is passed therethrough in the manner presently to be described. On the outer end of each insulating spool is mounted a magnet pole piece 15 preferably secured to the outer end of the corresponding stud 12 by a screw 16. In order to facilitate replacement and removal of the studs 12, the threads of the core 12 adapted to receive the screws 16 may be employed as a socket for a tool whereby the studs may be rotated with respect to the armature ring 11. It will also be noted that there is sufficient room between the inner end of the spool 12, the locknut 12a and the ring 11 to permit insertion of a special tool to loosen and tighten the nut 12a or to hold it from rotating with respect to the stud 12. The studs may thus be rotated to the point of disengagement with the locknuts and hence removed or replaced from the coils axially thereof. As a result, the windings may be wound on suitable fixtures and assembled together on the ring whereupon the studs are inserted and each winding radially adjusted individually, for proper operation. These members lie in a circular series as may be seen in Figure 3 and are so arranged with respect to the windings 14 and the wiring thereof that they alternate as north and south poles. Between adjacent members 15 are inserted bracing and insulating pieces 17 made of some material such as fiber as also shown in Figure 3.

As is evident in Figure 2, the cores 12 are radially adjustable by virtue of the threads on the inner ends thereof and fixed in any particular position of adjustment by the locknut 12a, as illustrated. The advantages of such construction reside not only in the fact that each core and pole piece may be adjusted individually as to spacing with respect to the drum 6 but also in permitting of the withdrawal of each core 12 radially outward of its coil in order that the windings may then be removed laterally of the supporting ring 11. This means of simplifying assembly and disassembly is important because of the fact that each winding is a continuation of each adjacent winding and would otherwise have to be cut and taped together in case of repairs. In other words, the windings do not have to be effected on the ring 11 but may be wound first and then assembled.

The magnets are energized from the battery 18 carried by the vehicle. Beneath the usual brake pedal 19 is mounted a rheostat 20 having a series of successive contacts 21. The shaft 22 on which the pedal 19 is mounted and which the pedal is adapted to turn, carries an arm 23 adapted to engage the contacts 21 respectively according to the pressure applied on the pedal. The positive terminal of the battery 18 is joined by a conductor 24 to the ammeter 25 on the instrument board 26, and the conductor is thence continued to a fuse 27 carried by the board 26. The fuse in turn is connected to one of the end contacts 21 by a conductor 28 as may be seen in Figure 4. The circuit continues through the arm 23 and shaft 22 which is joined by a conductor 29 to one of the forward brakes. A branch 30 extends from the conductor 29 to one of the rear brakes. Another line 31 extends from the conductor 30 and is branched at 32 and 33 to the remaining front and rear brakes respectively.

Return conductors 34, 35, 36 and 37 extend respectively from the electrical systems of the several brakes into a common return wire 38 which is grounded to the chassis as indicated by the numeral 39 in Figure 1. Each return conductor carries a lamp 40 for a purpose which will presently be described.

In the operation of the device, when the pedal 19 is in its normal or elevated position as shown in Figures 1 and 3, the position of the contact arm is such that the current flows through the whole resistance of the rheostat. Thus, the magnetic windings at the brakes receive little or no current and have no appreciable effect on the brake drums 6. In applying the brakes, the pedal is depressed. Resistance is cut out at the rheostat in proportion to the pressure or downward movement of the pedal, and the windings 14 are energized sufficiently to create a drag on the brake drums. Thus, as in other braking systems, the amount of braking effort is proportional to the pressure on the pedal. The ring 11 is of magnetic metal and thus further improves the magnetic field which has an attractive effect on the brake drums.

The lamps 40 are mounted at any suitable position such as on the instrument panel. They are obviously lighted when the brakes are applied, and the failure of any lamp to light is an indication that the windings at the corresponding brake are not receiving current.

Although a specific embodiment of the invention has been illustrated and described, it will be understood that various alterations in the details of construction may be made without departing from the scope of the invention, as indicated by the appended claims.

What I claim is:—

1. In a magnetic brake including a brake drum and electromagnets, an armature ring for supporting the magnets having a circular series of threaded openings through the periphery thereof, metallic cores threaded in said openings and conductive windings about each of said cores, and a metallic plate secured to the outer end of each of said cores, said plates each being removable from said cores, said cores each being removable through its winding whereby said windings may be removed laterally from said ring.

2. In a magnetic brake including a brake drum and electromagnets, an armature ring for supporting the magnets having a circular series of radial openings therethrough, a series of individual, connected electrical coils each having an opening therethrough coaxial with the openings in said ring, a metallic core insertable and removable through each of said coils, means for fixedly anchoring each of said cores with respect to said ring, a metallic pole piece removably secured to the outer end of each of said cores, said pole pieces also serving as a means for retaining said coils in fixed relation with said cores.

3. In a magnetic brake including a brake drum and electromagnets, an armature ring having metallic studs radiating therefrom, individual, connected electric coils about each of said studs, a metallic pole piece secured to the outer end of each of said studs, and non-metallic blocks separating each pole piece from each adjacent pole piece, said blocks each constituting insulating means and structural bracing means for retaining said coils and pole pieces in fixed spaced relation.

4. In a magnetic brake including a brake drum and electromagnets, an armature ring having a circular series of openings radially therethrough, a series of spools of insulating material having the openings therethrough coaxial with the radial openings through said ring, an electrical coil on each of said spools, a stud insertable through each of said spools for retaining said spool and said coil on said ring, a pole piece secured to the outer end of each of said studs, said pole pieces and said studs each being individually insertable and removable from said ring and said spools whereby the series of spools and coils may be mounted and dismounted on said ring as a unit, and non-metallic blocks separating said pole pieces, said blocks constituting insulating means and structural braces for said studs and said coils.

5. In a magnetic brake including a metallic brake drum and electromagnets, an armature for the magnets having a circular series of threaded openings radially therethrough, a threaded stud in each of said openings, an electrical winding about each of said studs, and a magnetic pole piece secured to the outer end of each of said studs, said studs each being adjustable radially of said ring whereby said pole pieces may be individually adjustable with respect to said ring and the brake drum.

LEONARD CLEO TERRILL.